(12) United States Patent
Boardman et al.

(10) Patent No.: US 6,680,549 B2
(45) Date of Patent: Jan. 20, 2004

(54) TAPERED ROTOR-STATOR AIR GAP FOR SUPERCONDUCTING SYNCHRONOUS MACHINE

(75) Inventors: William Hunter Boardman, Burnt Hills, NY (US); Ronald James Chila, Glenville, NY (US)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 09/985,026

(22) Filed: Nov. 1, 2001

(65) Prior Publication Data

US 2003/0080636 A1 May 1, 2003

(51) Int. Cl.[7] .................................................. H02K 9/00
(52) U.S. Cl. ............................ 310/52; 310/54; 310/59; 310/61
(58) Field of Search ............................ 310/52, 54, 55, 310/56, 57, 58, 61, 261, 262

(56) References Cited

U.S. PATENT DOCUMENTS

| 5,406,602 A | | 4/1995 | Hunsbedt et al. |
| 5,449,961 A | * | 9/1995 | Lugwig et al. ............... 310/52 |
| 5,633,543 A | | 5/1997 | Jarczynski et al. |
| 5,652,469 A | | 7/1997 | Boardman et al. |
| 6,339,268 B1 | | 1/2002 | Kaminski et al. |
| 6,392,320 B1 | | 5/2002 | Glahn et al. |

* cited by examiner

*Primary Examiner*—Thanh Lam
(74) *Attorney, Agent, or Firm*—Nixon & Vanderhye, P.C.

(57) ABSTRACT

A synchronous machine is disclosed comprising a rotor coupled to a rotor cooling system; a stator around the rotor and separated from the rotor by an annular gap between the rotor and an inner surface of the stator, wherein the annular gap has a variable thickness along a length of the gap, and a stator ventilation system independent of the rotor cooling system, wherein the stator ventilation system forces cooling gases through the annular gap.

27 Claims, 5 Drawing Sheets

TAPERED ROTOR-STATOR AIR GAP FOR SUPERCONDUCTING SYNCHRONOUS MACHINE

BACKGROUND OF THE INVENTION

The invention relates to superconducting synchronous electrical machines with a fluid flow ventilation system to cool the stator of the machine.

In the process of producing electricity, power generators create heat that must be dissipated from the generator. Heat occurs in generators due primarily to windage and friction, electric current flow, and time-varying magnetic fields in magnetic structures. Frictional heating occurs as the rotor spins at high speed in the generator. Similarly, heating also occurs as current flows through the rotor and stator coils, and as these coils rotate relative to one another in the magnetic fields of the generator. Losses in the magnetic circuit occur as the magnetic fields change with time in permeable materials, such as for example in the stator core and the rotor poles of a synchronous generator.

Generators are conventionally equipped with cooling systems to transfer heat from the stator and rotor away from the generator. Gas ventilation cooling systems have been used in conventional synchronous machines, such as generators and motors, that do not employ superconducting materials. These gas ventilation systems tightly couple the cooling of the stator and rotor. The ventilation system cools both the rotor and stator by forcing cooling gas through gas passages in the rotor and stator. Conventional ventilation systems have employed forward flow and reverse flows of cooling gases through the stator and rotor.

In a forward flow ventilation scheme (FIG. 1) the cooling gas flows through sections of the rotor and stator in series which creates a tight coupling between rotor and stator cooling systems. In a reverse flow ventilation scheme the cooling gas flows through stator and rotor in parallel, and then mixes in the machine air gap, which also leads to a coupling of the stator and rotor cooling.

Because of the coupling of the cooling of the rotor and stator, conventional ventilation systems have been configured to provide adequate cooling for both the stator and rotor. To provide cooling for the rotor, some compromises may have to be made in a conventional ventilation system with respect to cooling the stator and vice versa. It may be difficult to optimize the cooling of either the stator or rotor with a ventilation system that must provide cooling for both the rotor and stator. Nevertheless, ventilation systems have conventionally provided cooling for both the stator and rotor in large industrial and utility power generators.

In a superconducting synchronous machine the rotor field winding is operated at cryogenic temperatures through a cryorefrigeration system that has its own self-contained cooling circuit. A cold, cryogenic coolant is supplied to the rotor through a transfer coupling. The cryogenic coolant is circulated through a cooling circuit on the rotor where it removes heat from superconducting windings, and returns as heated coolant through the rotor and transfer coupling to a stationary cooling system. The cryogenic cooling system provides effective cooling of the rotor in a superconducting machine.

BRIEF SUMMARY OF THE INVENTION

Contrary to conventional machines where stator and rotor cooling systems are coupled in a single ventilation system, the cooling systems of a cryogenic rotor and the gas-cooled stator may be completely independent. The cryogenic cooling system for a superconducting rotor does not cool the stator. The stator of such a superconducting synchronous machine has a separate stator cooling system.

A stator ventilation system has been developed for a superconducting synchronous machine. The stator of a superconducting synchronous machine is cooled by a reverse ventilation system. Cooling gas, such as air or hydrogen, is drawn from the air gap and pumped through a diffuser, heat exchanger and through the stator core back to the air gap. The air gap is tapered along its axial length to optimize the ventilation flow to the stator. The tapering of the air gap may be achieved by shaping the outer surface of the cylindrical rotor.

In addition, a conventional synchronous machine may be retrofitted with a superconducting rotor. Similarly, a conventional stator and rotor ventilation system may be modified to function as a stator only ventilation system, such as is disclosed here. The rotor is coupled by a cryogenic coolant system. The stator ventilation may have forward or reverse coolant gas flow. The proposed stator cooling systems are independent of the type of superconducting rotor configurations, and can be equally applied to iron-core and air-core superconducting rotors.

In one embodiment, the invention is a synchronous machine comprising: a rotor coupled to a rotor cooling system; a stator around the rotor and separated from the rotor by an annular gap between the rotor and an inner surface of the stator, wherein the annular gap has a variable thickness along a length of the gap, and a stator ventilation system independent of the rotor cooling system, wherein the stator ventilation system forces cooling gases through the annular gap.

In another embodiment, the invention is a superconducting electromagnetic machine comprising: a rotor coupled to a rotor cooling system; a stator around the rotor and separated from the rotor by an annular gap between the rotor and an inner surface of the stator, wherein the annular gap has a variable thickness along a length of the gap, and a stator ventilation system independent of the rotor cooling system, wherein the stator ventilation system forces cooling gases through the annular gap.

In a further embodiment, the invention is a superconducting electromagnetic machine comprising: a solid core rotor cryogenically cooled by a superconducting rotor coil winding; a stator coaxial with the rotor and having stator coils magnetically coupled with the superconducting rotor coil winding, wherein the stator coils are arranged around the rotor, and the stator has cooling passages extending outwardly from an inner periphery of the stator; the inner periphery of the stator being separated from the rotor by an annular rotor gap, wherein the rotor gap has a tapered thickness along a length of the gap; the rotor being cooled by a cryogenic cooling fluid; and a stator ventilation system providing cooling gas to the outer periphery of the stator and the passages of the stator.

In a still further embodiment, the invention is a method for shaping a gap between a rotor and a stator in a synchronous electromagnetic machine, the method comprising the steps of: forming the stator having a cylindrical cavity to receive the rotor, wherein the stator includes cooling ducts open to the cavity; forming a cylindrical rotor surface on the rotor, wherein the rotor surface forms an inner cylindrical surface of the gap, and shaping the rotor surface to taper a thickness of the gap along a length of the gap.

DETAILED DESCRIPTION OF THE INVENTION

Figure 1:
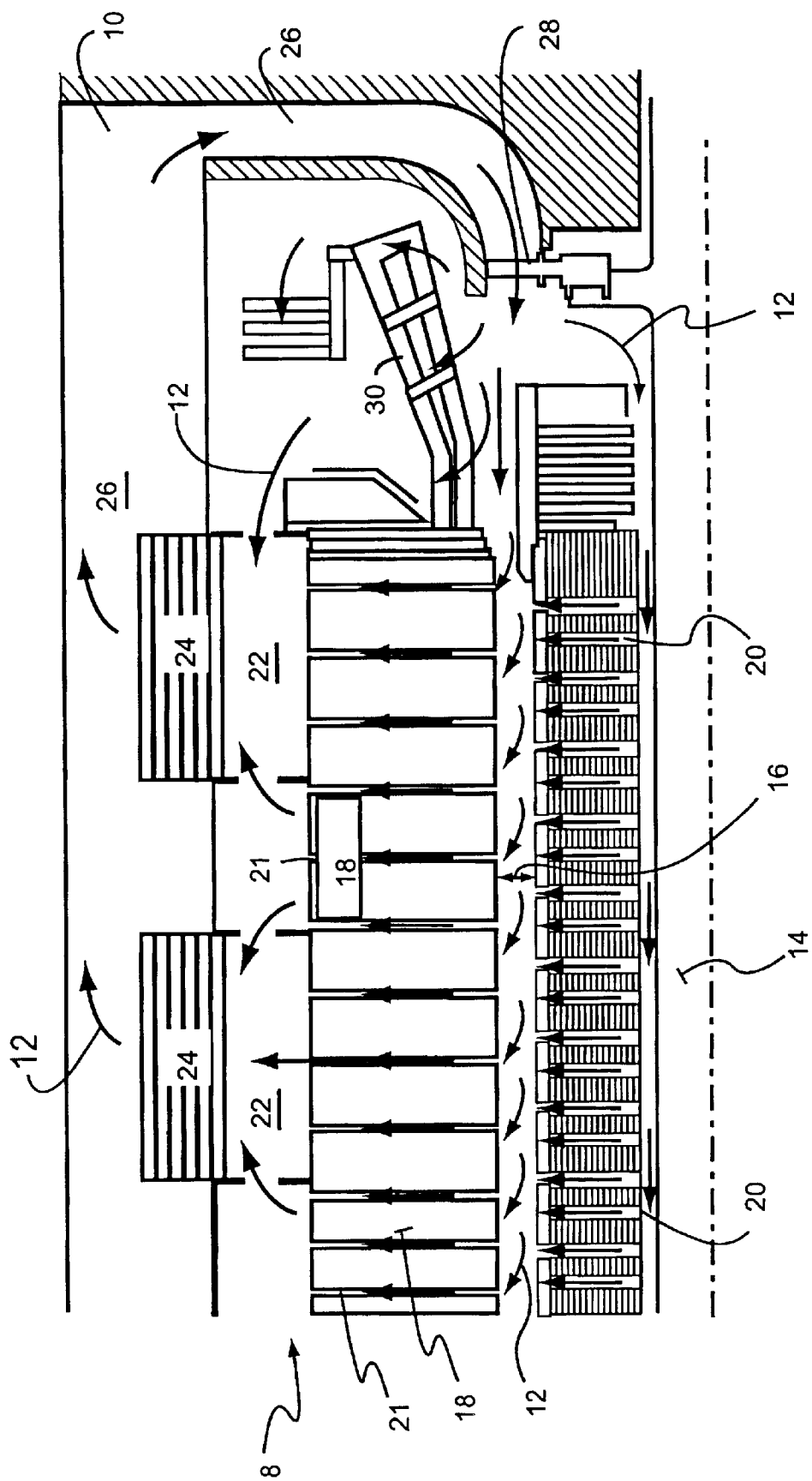
FIG. 1 is a schematic cross-sectional diagram of a quarter-section of a generator showing a conventional forward-flow cooling system.

FIG. 1 shows a conventional generator 8 having a conventional forward flow ventilation system 10, in which cooling gas (arrows 12) flows through the rotor 14, and/or rotor air gap 16, and then through the stator 18. The cooling gases may be air, hydrogen or some other cooling gas. The cooling gas flows in series through radial gas passages 20 in the rotor and similar radial gas ducts 21 in the stator, which creates a tight coupling between the rotor and stator cooling gas flows.

In a conventional ventilation system 10, as the cooling gas flows through the rotor where heat in the rotor is transferred to the gas. The temperature of the cooling gas rises towards the temperature of the rotor coils. The heated gas exits the rotor into the air gap 16 and mixes with cooling gas that directly entered the air gap 16. This mixture of cooling gases from the air gap enters the stator ducts 21. As the cooling gases flow through the stator, heat from the hot stator coils is transferred to the cooling gases, and removed from the stator as the heated gases exit the stator.

From the outer periphery of the stator, the heated cooling gases in a conventional ventilation system pass through annular ducts 22 that surround the stator and direct the hot gases to the heat exchangers 24. The hot gases are cooled in the heat exchangers 24, flow through recirculation ducts 26, and are pumped back into the rotor and air gap by a fan 28. The cooling gases are also driven through the rotor and into the gap 16 by centrifugal forces in the rotor. In addition, a portion of the cooling gases exiting the fan 28 is directed to cool the end turns 30 of the stator coil windings.

In a conventional cooling system, a portion of the flow of cooling gases (arrow 12) pumped by the fan is drawn into the rotor by centrifugal forces acting on the gases passing through the rotor passages 20. The heated rotor gases exit the ducts at the surface of the rotor into the air gap 16 between the rotor and stator. In addition, reverse flow ventilation systems, such as shown in U.S. Pat. No. 5,633,543, have provided cooling gases for stators and rotors.

Figure 2:
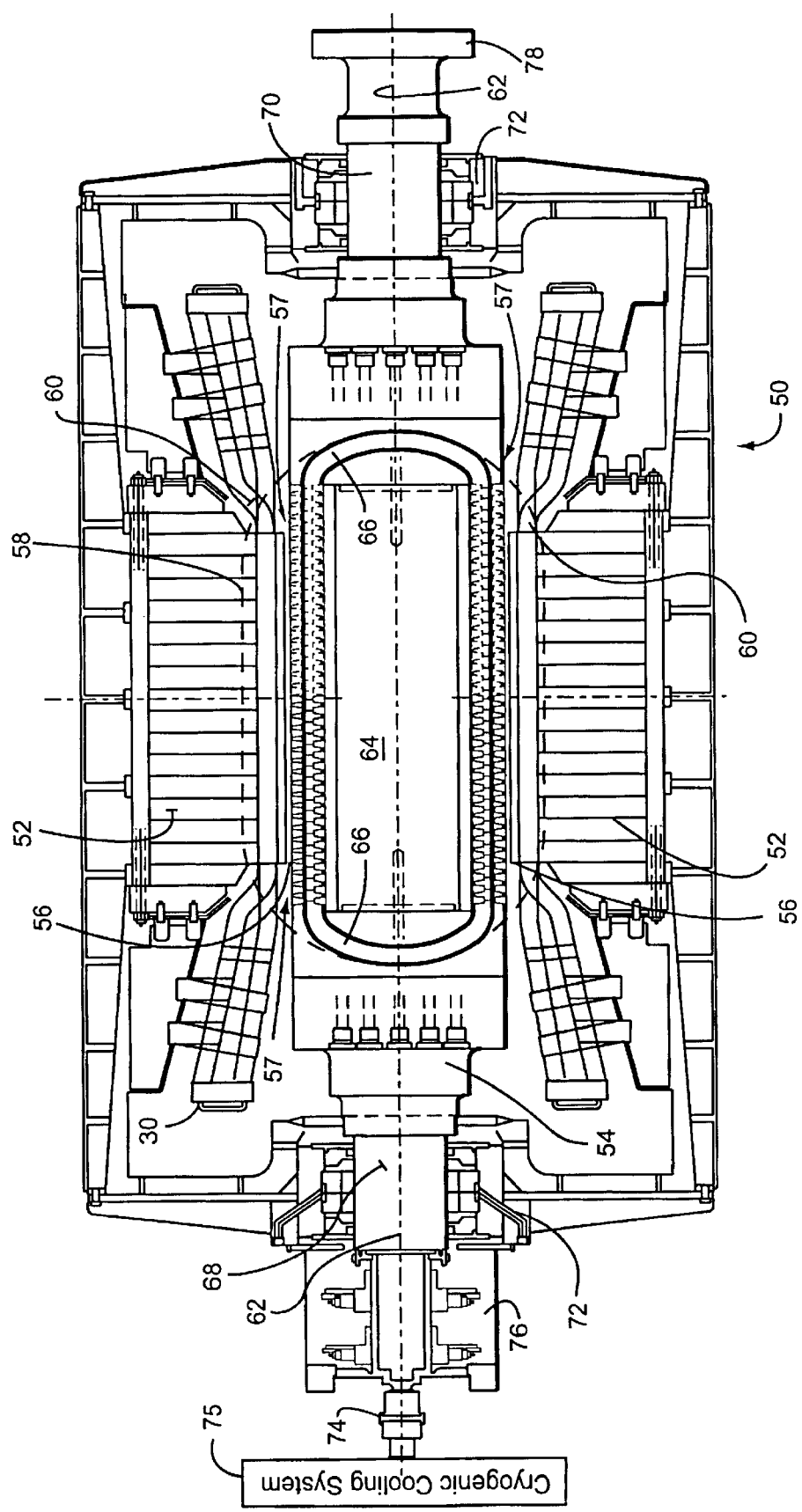
FIG. 2 is a schematic diagram of a synchronous electromagnetic machine having a superconducting rotor.

FIG. 2 shows an exemplary synchronous generator machine 50 having a stator 52 and a superconducting rotor 54. While the machine 50 is shown as a generator, it may also be configured as an electric motor. In the generator, the rotor includes field winding coil 66 that fit inside the cylindrical rotor cavity 56 of the stator. An annular gap 57 is formed between the outside periphery of the rotor and the cylindrical surface of the stator that defines a cylindrical cavity 56 which receives the rotor core 64. As the rotor turns within the stator, a magnetic field generated by the rotor and rotor coils rotates through the stator and creates an electrical current in the windings of the stator coils 60. This current is output by the generator as electrical power.

The rotor 54 has a generally longitudinally-extending axis 62 and a generally solid rotor core 64. The solid rotor core 64 has high magnetic permeability, and is usually made of a ferromagnetic material, such as iron. In a low power density superconducting machine, the iron core of the rotor is used to reduce the magnetomotive force (MMF), and, thus, minimize the amount of superconducting (SC) coil wire needed for the coil winding.

The rotor 54 supports at least one longitudinally-extending, racetrack-shaped, high-temperature superconducting (HTS) coil winding 66. The HTS coil winding may be alternatively a saddle-shape or have some other shape that is suitable for a particular HTS rotor design. The HTS coil winding is cooled by cryogenic fluid supplied to the rotor by an outside source 75 of cooling fluid. The cooling system 75 for the rotor 54 and its HTS coils 66 is independent of and isolated from cooling systems for other components of the generator 50, such as the ventilation system 82 (FIG. 3) for the stator 52.

The rotor includes a collector end shaft 68 and a drive end shaft 70 that bracket the rotor core 64, which are supported by bearings 72. The end shafts may be coupled to external devices. For example, the collector end shaft 68 has a cryogen transfer coupling 74 to the source 75 of cryogenic cooling fluid used to cool the SC coil windings in the rotor. An exemplary source of cryogenic cooling fluid is disclosed in commonly-owned and co-pending U.S. Pat. No. 6,553, 773 (now U.S. patent application Ser. No. 09/854,943, filed May 15, 2001) and entitled "Cryogenic Cooling Refrigeration System For Rotor Having A High Temperature Super-Conducting Field Winding And Method".

The cryogen transfer coupling 74 includes a stationary segment coupled to a source of cryogen cooling fluid and a rotating segment which provides cooling fluid to the HTS coil. The collector end shaft 68 also includes a collector 76 for electrically connecting to the rotating SC coil winding. The drive end shaft 70 of the rotor may be driven by a power turbine coupling 78.

Figure 3:
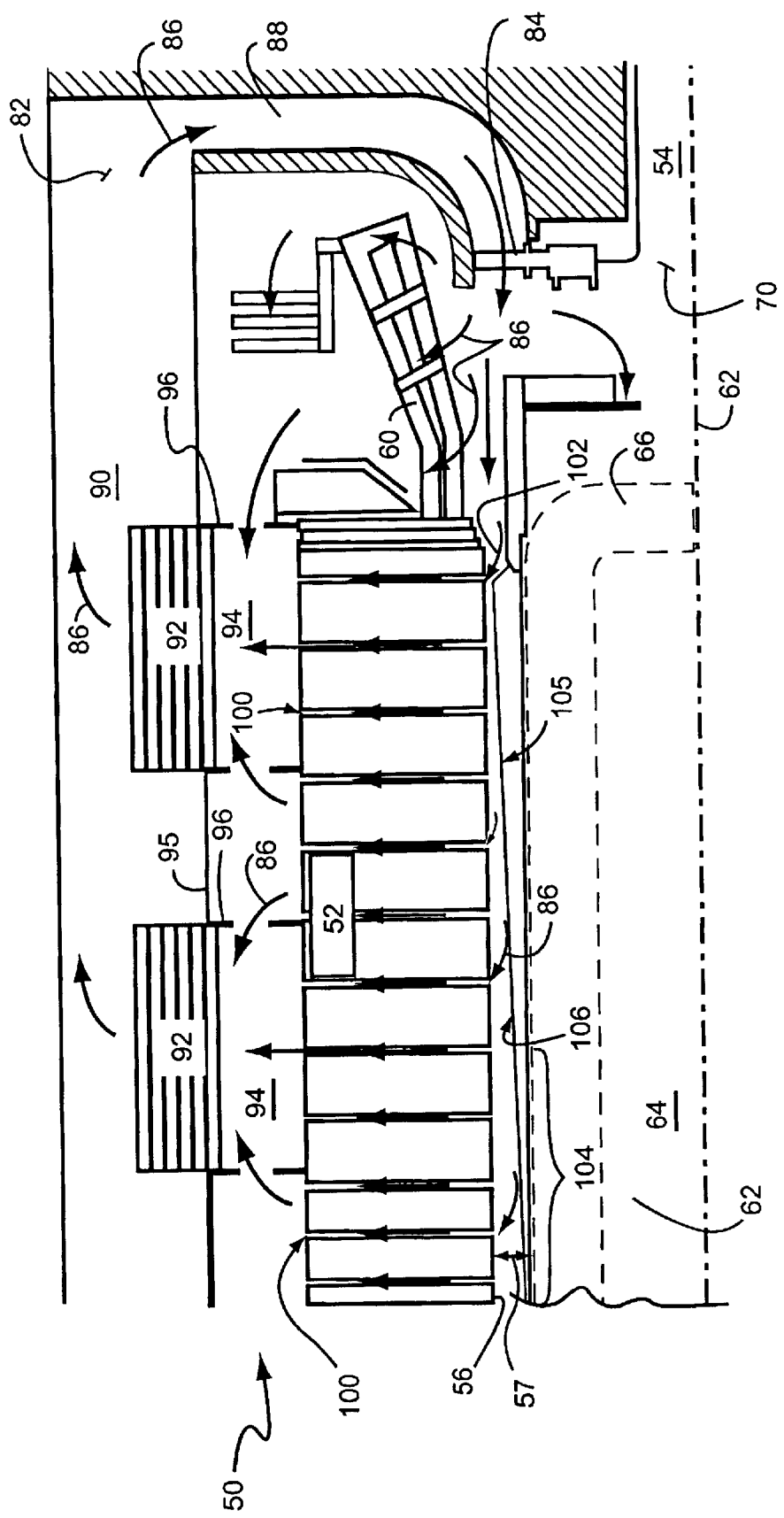
FIG. 3 is a schematic diagram of a quarter section of a superconducting generator having a solid rotor with a tapered outer surface, and a stator closed ventilation system.

FIG. 3 shows a cross-section of one-quarter of a generator 50 (see rotor axial center-line 62) having a forward-flow ventilation stator cooling system 82. The cooling system provides cooling gas, e.g., ambient air or hydrogen, to the stator. The stator cooling system is independent of and isolated from the cryogenic cooling system that provides cryogen cooling fluid to the rotor.

The stator ventilation system 82 includes cooling gas fans 84 that are affixed to the opposite end shafts (68 and 70) of the rotor. The fans 84 spin with the rotor to introduce cooling gas (arrows 86) into an annular air gap 57 between the rotor core 64 and cavity 56 of the stator 52. The cooling gas is pumped by the fan 82 into the air gap 57. The fan draws the cooling gas from a gas passage 88, which may receive the gas from gas duct plenum chamber/diffuser 90 that extends around stator of the generator. Alternatively (or in addition), the fan draws new air from outside the generator.

The plenum chamber duct 90 receives the cooled gas from one or more heat exchanger 92. The heat exchangers extract heat from the gas exiting the stator ducts 100 and stator chambers 94. The heat exchangers cool the gas so that it may be recirculated to cool the stator. Hot gas from the stator ducts 100 enters stator chambers 94 surrounding the outer periphery of the stator. The chambers have a cylindrical outer wall 95 that circumferentially surrounds the stator and has openings for the heat exchangers. The chambers may also include annular baffles 96 extending radially outward from the stator. These baffles distribute the heated air from the stator ducts 100 to the heat exchangers 92.

Heat is extracted from the stator coils 60 as the cooling gas passes through the stator cooling ducts 100. The stator ducts may be arranged in the stator to optimize the cooling of the stator coils. For example, the frequency of cooling ducts along the stator axis and/or the cross-sectional area of the ducts may be selected to evenly distribute cooling in the stator or to otherwise optimize stator cooling.

The ventilation system 82 may be a closed gas system wherein cooling gas, e.g., hydrogen or air, is circulated through the stator, heat exchanger and plenum to cool the stator. The cooling system may also be open, where fresh cool air is continually drawn into the rotor gap and stator by the fan 84.

In a closed loop ventilation system 82 for a machine with a superconducting rotor, the cooling gas such as air or hydrogen is circulated from the heat exchanger(s) 92 through the fans 84 and the air gap 57, into stator cooling duct passages 100 to extract heat from the stator coils, and back to the heat exchanger. A cooling system dedicated solely to the stator simplifies the complexity of the ventilation system, as compared to conventional ventilation systems that had two flow paths through the stator and rotor.

Figure 4:
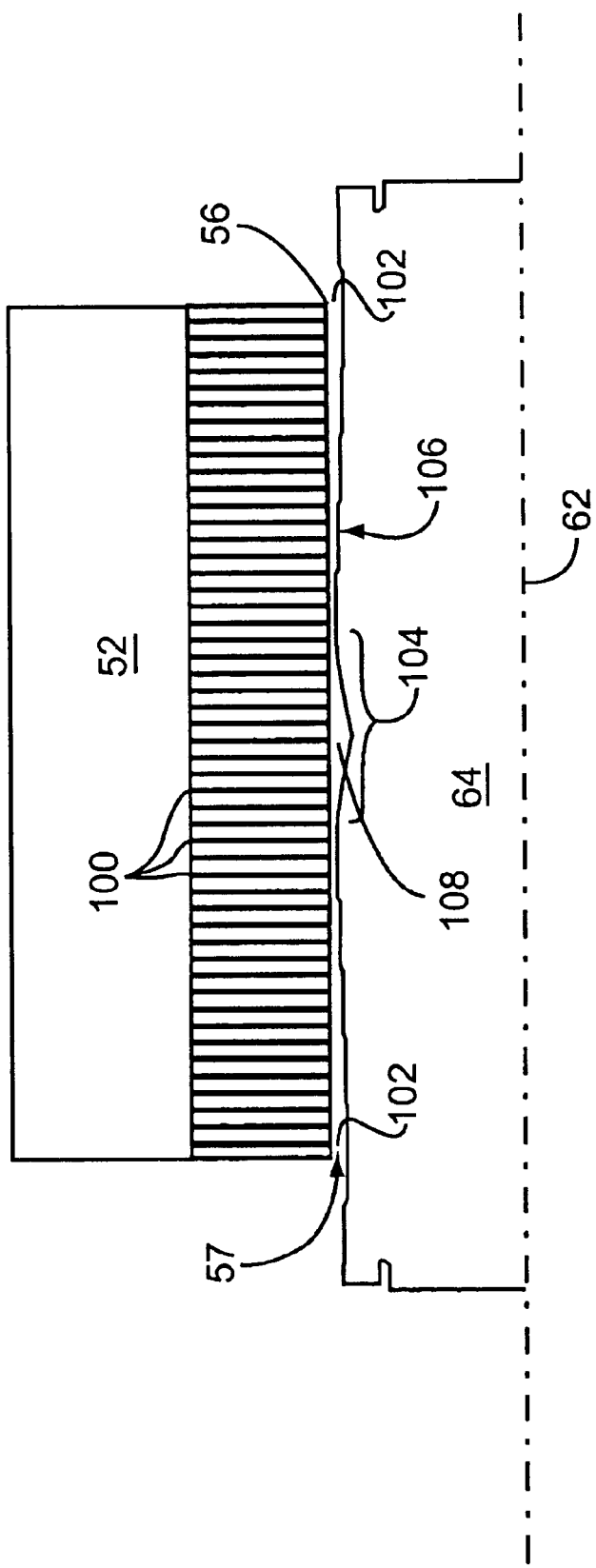
FIG. 4 is a side view diagram of a one half section of a segmented stator and a rotor having a tapered surface.
Figure 5:
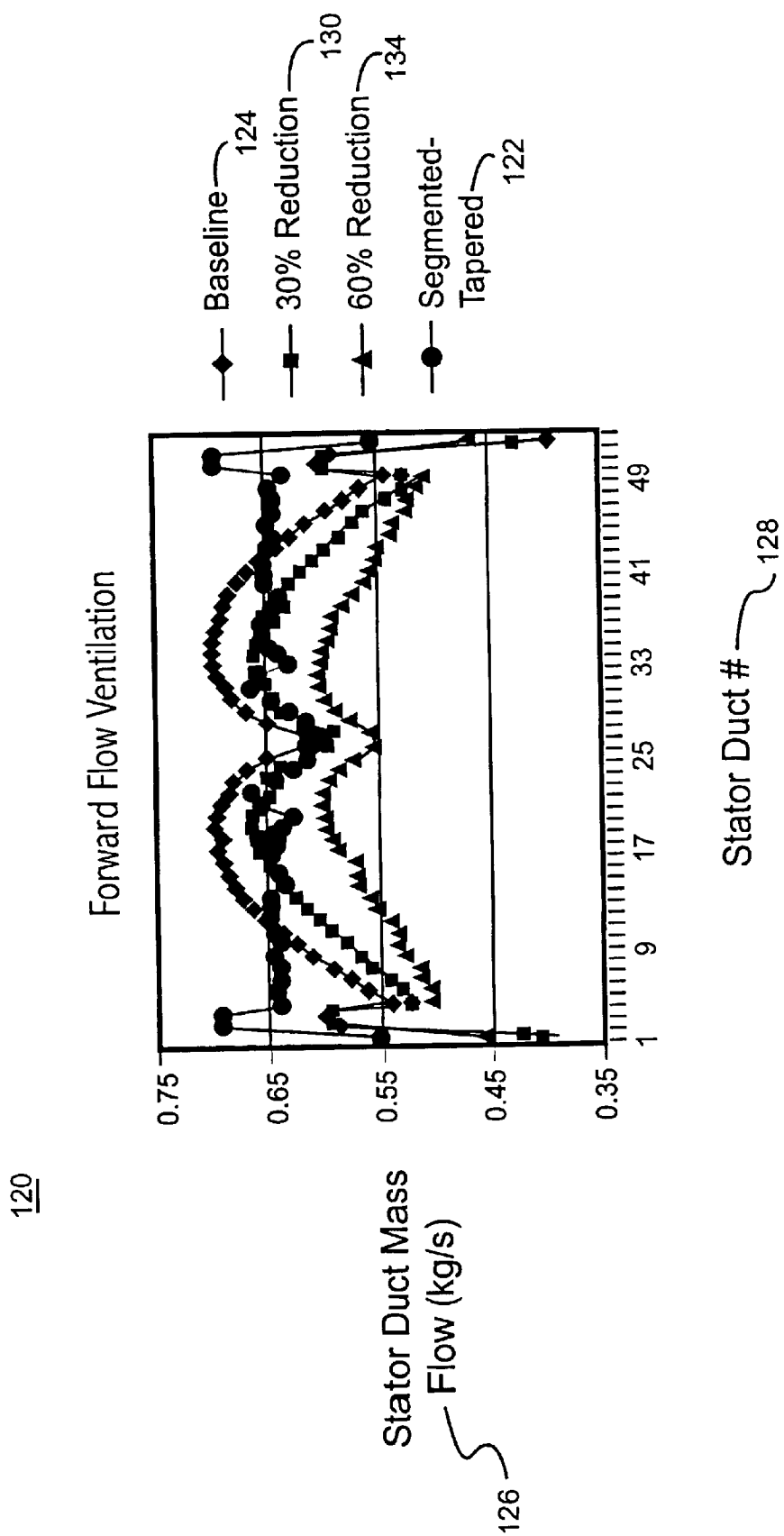
FIG. 5 is a graph comparing stator ventilation flow versus stator duct location for various cooling configurations.

The stator cooling system 82 is also applicable for synchronous machines, e.g., generators and motors, where a conventional rotor is replaced with a superconducting rotor. In such a case, the combined rotor and stator flow ventilation system of the original machine may be converted to the stator only, forward flow system with a tapered air gap as shown in FIGS. 3, 4 or 5, or to a stator only, reverse flow cooling system that also includes a tapered rotor gap.

The air gap 57 between the superconducting rotor and the stator core is a cylindrical region through which cooling gas flows before entering the stator ducts 100. The cooling gas enters the air gap from opposite ends 102 of the gap at the ends of the stator core and rotor core. The gas is pumped into the air gap by fans 84.

The flow of cooling gas through the air gap 57 (and hence into the stator ducts 100) is influenced by the shape of the air gap. For example, a narrow air gap may reduce the flow through the air gap and increase the gas back pressure at the gap inlet 102 to the gap. A narrow air gap may also reduce the dynamic pressure and hence reduce the volume of flow entering the stator ducts adjacent the narrow section of the air gap. In contrast, a wide air gap may allow for increased flow and reduce the back pressure at the gap inlet 102. A wide gap may increase dynamic pressure and increase the flow volume entering the stator ducts adjacent the wide gap section. Varying the width of the air gap between the entrance 102 and the center 104 provides some measure of control of the volume and dynamic pressure of the cooling gases at openings to each stator duct 100.

By tapering (see slope 105) the air gap 57 such that there are (for example) relatively thick portions of the air gap towards the center 104 of the rotor and relatively thin portions of the air gap at the outer extremities 102 of the rotor core or vice versa, the pressure and flow of the cooling gas through the air gap can be controlled. For example, the air flow through the air gap 57 may be controlled to compensate for flow frictional losses that occur as the cooling gases flow through the air gap from the end 102 (or both ends) of the rotor core towards the core center 104. By proper tapering 105 of the air gap, the flow of cooling gas into each of the stator ducts 100 arranged along the length of the stator may be relatively uniform through each stator duct (or have other desirable gas flow characteristics at the entrances to the stator ducts).

The taper 105 along the length of the air gap 57 may be achieved by tapering in the cylindrical inner periphery of the stator core that forms the outer periphery of the air gap. Alternatively, the air gap may also be tapered by shaping the outer surface of an cylindrical electrical magnetic (EM) shield 106 on the superconducting rotor core (see FIG. 6). The EM shield is at the outer periphery of the rotor core. Further, the air gap may be tapered by a combination of shaping the inner periphery of the stator core and the outer periphery of the rotor core.

Tapering the inner periphery 56 of the stator core may be relatively complex because each stator core segment would have to be machined or punched at its inner periphery to form the desired tapered shape. In addition to increasing the complexity of assembling stator core segments into a stator core, having each stator core segment with a unique air gap surface poses difficulties in maintaining replacement stator core segment parts or segments parts for repairing defective stator cores in the field. While tapering the inner periphery of the stator core is an available approach to forming a tapered air gap, it may be preferable in many applications to taper the EM shield on the rotor core.

FIG. 4 shows in cross-section an EM shield 106 having a tapered outer surface. The taper is segmented to achieve uniform cooling flow through the stator ducts. The segmented taper design has tapered slopes along the EM shield surface. The slope of the taper extends from opposite ends 102 of the rotor core towards the center 104 of the core.

The EM shield 106 on an SC rotor core 64 is a metallic sheet formed in a cylinder that wraps around the outer surface of the rotor. While conventionally the EM shield is a uniform thickness cylinder having a smooth outer surface, in the present embodiment the outer surface 108 of the EM shield is shaped to form a tapered air gap surface. The shield may be shaped by thickening or thinning the EM shield at appropriate locations along the lengths of the rotor. Alternatively, the EM shield may be shaped by adding rings around the rotor core that fit below or above the shield at appropriate locations along the length of the rotor core.

The slope of the taper of the EM shield (and hence the taper of the air gap) may be linear (see 105 in FIG. 3) or may vary along the length of the gap (see FIG. 4). As shown in FIG. 4, the slope of the EM shield surface accelerates near a center portion 104 of the rotor core to form a relatively thick air gap 108 at the center of the length of the gap. A thick air gap at the center portion of the rotor core reduces the cooling gas back pressure at the inlet to the air gap and allows for more cooling gas to flow to those stator ducts that open to the center portion of the length of the air gap.

FIG. 5 is a graph 120 of cooling flow 126 through stator ducts 128 for various air gap taper shapes. Several tapered air gap designs were evaluated using two-dimensional computational fluid dynamics (CFD) analysis. The design studies used a once-through, forward-flow stator ventilation scheme in which air flow is introduced by fans into the air gap and flow from the air gap into the stator core. The stator core radial ducts 100 were assumed to be spaced evenly (see duct Nos. 128) along the axis of the rotor core. While these parameters were set for the CFD analysis, in a practical application the stator radial ducts 100 may be spaced unevenly along the axis of the rotor core and may have uneven cross-sectional areas to promote a uniform cooling flow through the stator or other desirable flow characteristics through the stator. In addition, a ventilation scheme may be used with tapered air gaps in which cooling gas is circulated through the ventilation system.

As shown in the chart 120 of FIG. 5, a segmented taper air gap 122 (wherein the center portion of the air gap is thicker than gap portions near the ends of the rotor core) provided relatively uniform air flow through all stator ducts. The baseline air gap profile 124 has a uniform thickness along the length of the gap 57.

As shown in the stator duct cooling flow chart 120, the air flow 126 varies substantially according to the position of the stator ducts 128 along the length of the stator core. The ducts 100 at the ends of the rotor core (ducts Nos. 1 to 10, and 41 to 49) and at the center portion (ducts Nos. 24 to 26) had relatively low cooling flow for the baseline air gap 124. In contrast, the middle stator ducts (Nos. 10 to 20 and 30 to 35) had relatively high cooling gas flow with the baseline gap. Due to the uneven cooling gas flow in the ducts, the stator with the baseline air gap may not enjoy uniform stator cooling.

Other tapered shapes of the air gap may be designed to achieve a desired cooling gas flow through the stator ducts. The cooling flow due to a linearly tapered air gap is represented by the 30% reduction 130 and 60% gap reduction 132. These linearly tapered gaps are thick at the ends of the rotor core and are thinnest at the center of the rotor core. A linearly tapered air gap 108 is schematically shown in FIG. 3. The percentage reduction (30% and 60%) represents the relative thickness of the air gap at the center 104 of the rotor core as compared to the ends 102 of the gap.

As shown in the chart 120, the 30% and 60% linearly tapered air gap had elevated cooling gas back pressure at the gap entrance due to the reduced thickness of the center of the gap. However, increasing the linear slope of the gap from 0%, 30% to 60% progressively reduced the cooling flow variations between the stator ducts.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A synchronous machine comprising:
    a rotor coupled to a rotor cooling system;
    an annular stator around the rotor and having radial cooling passages;
    an annular gap between the rotor and the stator, and said annular gap has a variable thickness along a length of the gap, and
    a stator ventilation system providing cooling gases through said annular gap and said cooling passages in the stator.

2. A synchronous machine as in claim 1 wherein said thickness of the annular gap is thickest at a center portion of the length of the gap.

3. A synchronous machine as in claim 1 wherein said thickness of the annular gap is thicker at a center portion of the length of the gap than at an end portion of said annular gap.

4. A synchronous machine as in claim 1 wherein said thickness of the annular gap increases non-linearly from an end portion of the gap towards a center portion of the gap.

5. A synchronous machine as in claim 1 wherein said thickness of the annular gap increases non-linearly along the length of the gap.

6. A synchronous machine as in claim 1 wherein said annular gap has an inner cylindrical surface formed by a shield on a rotor core section of the rotor, and said shield has a variable thickness.

7. A synchronous machine as in claim 1 wherein said annular gap has an inner cylindrical surface defined by a shield on a rotor core of the rotor, and said shield has a tapered outer surface adjacent the inner cylindrical surface of the gap.

8. A synchronous machine as in claim 1 wherein said annular gap has a tapered inner cylindrical surface defined by the rotor.

9. A synchronous machine as in claim 1 wherein said rotor comprises a superconducting coil, and said rotor cooling system provides cryogenic cooling fluid to said coil.

10. A synchronous machine as in claim 1 which is an electromagnetic generator.

11. A synchronous machine as in claim 1 which is a motor.

12. A synchronous machine as in claim 1 wherein said ventilation system is a reverse flow ventilation system.

13. A synchronous machine as in claim 1 wherein said ventilation system is a closed-loop system in which cooling gas circulates through the gap, stator and a heat exchanger.

14. A synchronous machine as in claim 1 wherein variable thickness of the annular gap is non-linear along the length of the gap and is provided by a segmented steps on an outer cylindrical surface of the rotor.

15. A superconducting electromagnetic machine comprising:
    a solid core rotor having a cryogenically cooled superconducting rotor coil winding;
    a stator coaxial with said rotor and having stator coils magnetically coupled with said superconducting rotor coil winding, said stator coils arranged around said rotor, and said stator having cooling passages extending outwardly from an inner periphery of the stator, said inner periphery separated from the rotor by an annular rotor gap, wherein said rotor having a cylindrical surface tapered non-linearly along an axis of the stator and said rotor gap has a tapered thickness along a length of the gap;
    said rotor being cooled by a cryogenic cooling fluid, and
    a stator ventilation system providing cooling gas to said annular rotor gap and said passages of the stator.

16. A synchronous machine as in claim 15 wherein said annular gap is thickest at a center portion of the length of the gap.

17. A synchronous machine as in claim 15 wherein said annular gap is thicker at a center portion of the length of the gap than at an end portion of said annular gap.

18. A synchronous machine as in claim 15 wherein said thickness of the annular gap gradually increases from an end portion of the gap towards a center portion of the gap.

19. A synchronous machine as in claim 15 wherein said annular gap has a sloped inner cylindrical surface defined by a shield on a rotor core section of the rotor.

20. A synchronous machine as in claim 19 wherein said shield a tapered surface forming the inner cylindrical surface of the gap.

21. A synchronous machine as in claim 15 wherein said annular gap has a sloped outer cylindrical surface defined by the stator.

22. A machine as in claim 15 wherein the surface of the rotor is segmented in steps to form the tapered thickness of the gap.

23. A method for cooling a superconducting electromagnetic machine having a rotor core including a superconducting rotor coil winding and a stator core and a stator ventilation system, said method comprising the steps of:
   a. cryogenically cooling the rotor coil winding;
   b. moving cooling gas into an annular gap between the rotor and stator, wherein said annular gap is tapered along a length of the gap, and
   c. the cooling gas flowing from the gap into ducts of the stator, wherein said ducts have openings adjacent the gap and along a length of the gap.

24. A method for cooling as in claim 23 wherein the annular gap is thickest at a center portion along the length of the gap, and said gap increases in thickness non-linearly along the length of the gap.

25. A method for shaping a gap between a rotor and a stator in a synchronous electromagnetic machine, said method comprising the steps of:
   a. forming the stator having a cylindrical cavity to receive said rotor, wherein said stator includes cooling ducts open to said cavity;
   b. forming a cylindrical rotor surface on said rotor, wherein said rotor surface forms an inner cylindrical surface of said gap, and
   c. shaping the rotor surface to taper a thickness of the gap along a length of the gap.

26. A method for shaping a gap between a rotor and a stator as in claim 25 further comprising selecting said non-linear taper of the gap to uniformly distribute cooling gas into the cooling ducts of the stator core.

27. A method for shaping a gap between a rotor and a stator as in claim 25 further comprising thickening the gap at a center portion of the gap.

* * * * *